United States Patent
Upadhyay et al.

(10) Patent No.: US 11,593,219 B2
(45) Date of Patent: *Feb. 28, 2023

(54) METHOD AND SYSTEM FOR AUTO LIVE-MOUNTING DATABASE GOLDEN COPIES

(71) Applicant: EMC IP Holding Company LLC, Hopkinton, MA (US)

(72) Inventors: Navneet Upadhyay, Ghaziabad (IN); Shraddha Chunekar, Madhya Pradesh (IN); Haritha Kora, Andhra Pradesh (IN); Shelesh Chopra, Bangalore (IN); Amith Ramachandran, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 426 days.

This patent is subject to a terminal disclaimer.

(21) Appl. No.: 16/563,389

(22) Filed: Sep. 6, 2019

(65) Prior Publication Data

US 2020/0349017 A1  Nov. 5, 2020

Related U.S. Application Data

(63) Continuation-in-part of application No. 16/562,190, filed on Sep. 5, 2019.
(Continued)

(51) Int. Cl.
*G06F 16/182* (2019.01)
*G06F 11/14* (2006.01)
(Continued)

(52) U.S. Cl.
CPC .......... *G06F 11/1456* (2013.01); *G06F 3/065* (2013.01); *G06F 3/067* (2013.01);
(Continued)

(58) Field of Classification Search
CPC ............. G06F 11/1456; G06F 16/1824; G06F 3/0614; G06F 3/065; G06F 3/067;
(Continued)

(56) References Cited

U.S. PATENT DOCUMENTS 7,827,366 B1   11/2010  Nadathur et al.
8,261,126 B2 *  9/2012  Sosnosky ................ H04L 67/10
                                                        714/13
(Continued)

*Primary Examiner* — Anhtai V Tran
*Assistant Examiner* — Ken Hoang
(74) *Attorney, Agent, or Firm* — Chamberlain, Hrdlicka, White, Williams & Aughtry

(57) ABSTRACT

A method and system for auto live-mounting database golden copies. Specifically, the disclosed method and system entail reactively auto live-mounting golden copy databases on hosts or proxy hosts based on the operational state of one or more database hosts and/or one or more assets (or databases) residing on the database host(s). Should a database host prove to be unresponsive, through periodic monitoring, databases residing on the database host may be brought back online on a proxy database host using stored golden copies respective of the aforementioned databases. Alternatively, should a given database on any database host exhibit an operational abnormality (e.g., an error, failure, etc.), the given database may be brought back online on the database host or a proxy database host using a stored golden copy respective of the given database. Accordingly, through the disclosed method and system, database outages may be minimized.

17 Claims, 10 Drawing Sheets

Related U.S. Application Data

(60) Provisional application No. 62/841,764, filed on May 1, 2019.

(51) Int. Cl.
   *G06F 11/07* (2006.01)
   *G06F 3/06* (2006.01)
   *G06F 11/30* (2006.01)

(52) U.S. Cl.
   CPC ........ *G06F 3/0614* (2013.01); *G06F 11/0709* (2013.01); *G06F 11/1451* (2013.01); *G06F 11/1464* (2013.01); *G06F 11/3006* (2013.01); *G06F 16/1824* (2019.01)

(58) Field of Classification Search
   CPC ............. G06F 11/0709; G06F 11/1451; G06F 11/1464; G06F 11/3006
   See application file for complete search history.

(56) References Cited

U.S. PATENT DOCUMENTS

| | | |
|---|---|---|
| 9,235,606 B1 | 1/2016 | Mooney |
| 9,652,326 B1 * | 5/2017 | Bauer .................. G06F 11/203 |
| 9,946,603 B1 | 4/2018 | Kumar et al. |
| 2014/0101113 A1 | 4/2014 | Zhang |
| 2015/0142748 A1 | 5/2015 | Gottemukkula et al. |
| 2015/0293817 A1 | 10/2015 | Subramanian |
| 2016/0004599 A1 | 1/2016 | Mam et al. |
| 2016/0085575 A1 | 3/2016 | Dornemann et al. |
| 2016/0314046 A1 | 10/2016 | Kumarasamy |
| 2020/0167091 A1 | 5/2020 | Haridas et al. |
| 2020/0210091 A1 | 7/2020 | Shu |
| 2020/0241908 A1 * | 7/2020 | Dornemann ........ G06F 11/2094 |

\* cited by examiner

METHOD AND SYSTEM FOR AUTO LIVE-MOUNTING DATABASE GOLDEN COPIES

CROSS-REFERENCE TO RELATED APPLICATIONS

This application is a continuation-in-part of U.S. patent application Ser. No. 16/562,190, filed on Sep. 5, 2019, and entitled: "METHOD AND SYSTEM FOR LIVE-MOUNTING DATABASE BACKUPS." Accordingly, this application claims benefit of U.S. patent application Ser. No. 16/562,190 under 35 U.S.C. § 120, which is hereby incorporated by reference in its entirety. In turn, U.S. patent application Ser. No. 16/562,190 claims priority under 35 U.S.C. § 119(e) to U.S. Provisional Patent Application No. 62/841,764, filed on May 1, 2019, which is also hereby incorporated by reference in its entirety.

BACKGROUND

Database recovery defines the process of restoring database data following a failover event. More specifically, restoration of the database data often entails provisioning storage on a target device and, subsequently, migrating vast amounts of data across a network to the target device.

SUMMARY

In general, in one aspect, the invention relates to a method for accessing asset data. The method includes obtaining, from an asset state monitor and for an asset residing on a client device, a first operational state indicative that the asset is exhibiting an asset abnormality, identifying, in response to the first operational state, an auto-mount policy for the client device, examining an asset abnormality clause of the auto-mount policy, and based on the asset abnormality matching a trigger abnormality of a set of trigger abnormalities specified under the asset abnormality clause, live-mounting an asset golden copy for the asset onto a target client device.

In general, in one aspect, the invention relates to a client device manager. The client device manager includes a computer processor, an asset state monitor executing on the computer processor, and a manager kernel operatively connected to the asset state monitor, and including the computer processor or executing on the computer processor, wherein the manager kernel is configured to obtain, from the asset state monitor and for an asset residing on a client device, a first operational state indicative that the asset is exhibiting an asset abnormality, identify, in response to the first operational state, an auto-mount policy for the client device, examine an asset abnormality clause of the auto-mount policy, and based on the asset abnormality matching a trigger abnormality of a set of trigger abnormalities specified under the asset abnormality clause, live-mount an asset golden copy for the asset onto a target client device.

In general, in one aspect, the invention relates to a non-transitory computer readable medium (CRM). The non-transitory CRM includes computer readable program code, which when executed by a computer processor, enables the computer processor to obtain, from an asset state monitor and for an asset residing on a client device, a first operational state indicative that the asset is exhibiting an asset abnormality, identify, in response to the first operational state, an auto-mount policy for the client device, examine an asset abnormality clause of the auto-mount policy, and based on the asset abnormality matching a trigger abnormality of a set of trigger abnormalities specified under the asset abnormality clause, live-mount an asset golden copy for the asset onto a target client device.

Other aspects of the invention will be apparent from the following description and the appended claims.

DETAILED DESCRIPTION

Figure 1A:
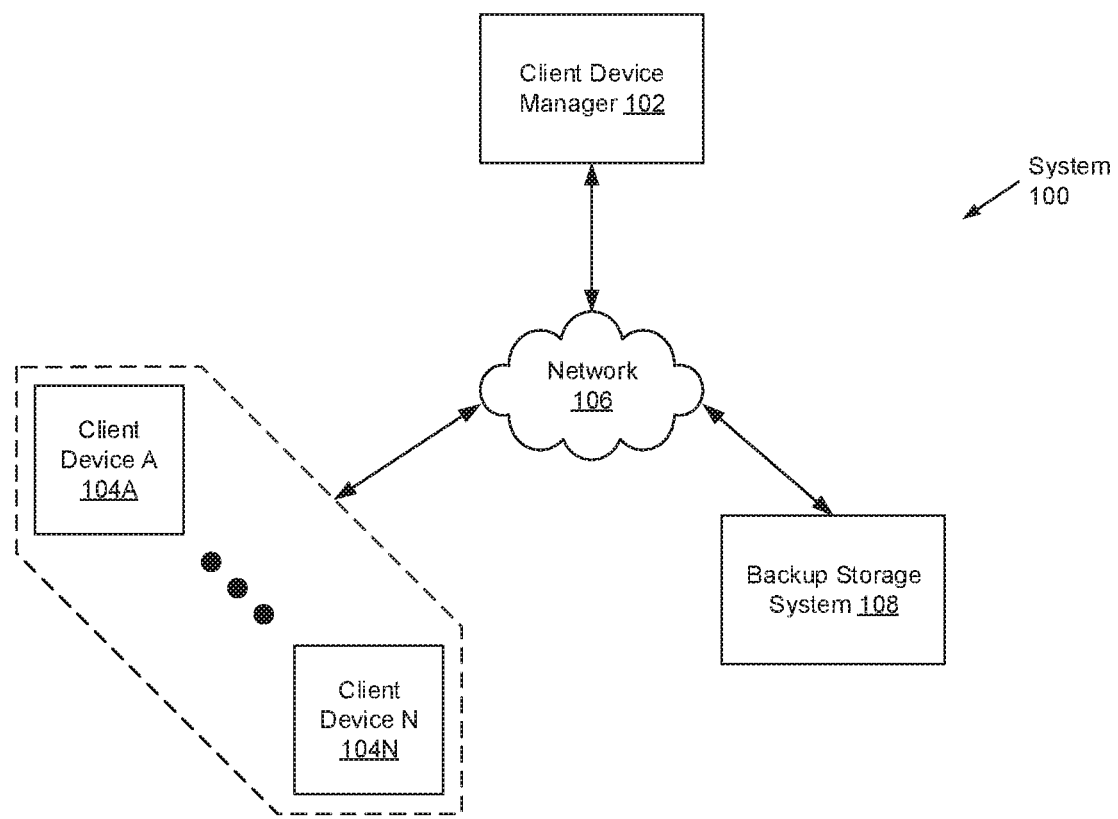
FIG. 1 shows a system in accordance with one or more embodiments of the invention.
FIG. 1B shows a client device manager in accordance with one or more embodiments of the invention.
FIG. 1C shows a client device in accordance with one or more embodiments of the invention.
FIG. 1D shows a backup storage system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-7, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for auto live-mounting database golden copies. Specifically, one or more embodiments of the invention entails reactively auto live-mounting golden copy databases on hosts or proxy hosts based on the operational state of one or more database hosts and/or one or more assets (or databases) residing on the database host(s). Should a database host prove to be unresponsive, through periodic monitoring, databases residing on the database host may be brought back online on a proxy database host using stored golden copies respective of the aforementioned databases. Alternatively, should a given database on any database host exhibit an operational abnormality (e.g., an error, failure, etc.), the given database may be brought back online on the database host or a proxy database host using a stored golden copy respective of the given database. Accordingly, through embodiments of the invention, database outages may be minimized.

FIG. 1A shows a system in accordance with one or more embodiments of the invention. The system (100) may include a client device manager (102) operatively connected to one or more client devices (104A-104N) and a backup storage system (108). Each of these system (100) components is described below.

In one embodiment of the invention, the above-mentioned system (100) components may operatively connect to one another through a network (106) (e.g., a local area network (LAN), a wide area network (WAN) such as the Internet, a mobile network, etc.). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components. Moreover, the above-mentioned system (100) components may communicate with one another using any combination of wired and/or wireless communication protocols.

In one embodiment of the invention, the client device manager (102) may represent a monitoring and management system, which may at least be responsible for client device (104A-104N) administration and/or maintenance. To that extent, the client device manager (102) may include functionality to perform the various steps outlined below with respect to FIGS. 2-4, which may be directed to handling client device (104A-104N) unresponsiveness, handling operationally abnormal databases residing on the client device(s) (104A-104N), and overseeing database golden copy auto live-mounting, respectively. Furthermore, the client device manager (102) may be implemented using one or more servers (not shown). Each server may be a physical server, which may reside in a datacenter, or a virtual server, which may reside in a cloud computing environment. Additionally or alternatively, the client device manager (102) may be implemented using one or more computing systems similar to the exemplary computing system shown in FIG. 7. The client device manager (102) is described in further detail below with respect to FIG. 1B.

In one embodiment of the invention, a client device (104A-104N) may represent any physical appliance or computing system designed and configured to receive, generate, process, store, and/or transmit digital data, as well as to provide an environment in which one or more computer programs may execute thereon. The computer programs may, for example, implement large-scale and complex data processing; or implement one or more services offered locally or over the network (106). Further, in providing an execution environment for any computer programs installed thereon, a client device (104A-104N) may include and allocate various resources (e.g., computer processors, memory, storage, virtualization, network bandwidth, etc.), as needed, to the computer programs and the tasks (or processes) instantiated thereby. One of ordinary skill will appreciate that a client device (104A-104N) may perform other functionalities without departing from the scope of the invention. Examples of a client device (104A-104N) may include, but are not limited to, a desktop computer, a laptop computer, a server, a mainframe, or any other computing system similar to the exemplary computing system shown in FIG. 7. Client devices (104A-104N) are described in further detail below with respect to FIG. 1C.

In one embodiment of the invention, the backup storage system (108) may represent a data backup, archiving, and/or disaster recovery storage system. The backup storage system (108) may be implemented using one or more servers (not shown). Each server may be a physical server, which may reside in a datacenter, or a virtual server, which may reside in a cloud computing environment. Additionally or alternatively, the backup storage system (108) may be implemented using one or more computing systems similar to the exemplary computing system shown in FIG. 7. The backup storage system (108) is described in further detail below with respect to FIG. 1D.

While FIG. 1A shows a configuration of components, other system (100) configurations may be used without departing from the scope of the invention.

Figure 1B:
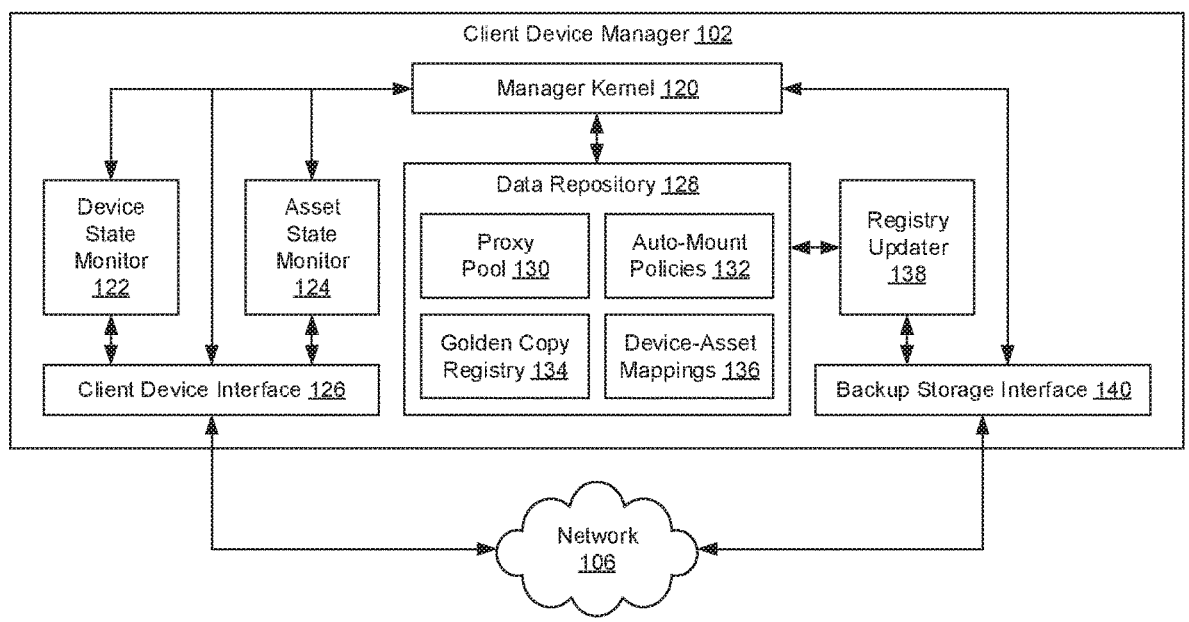

FIG. 1B shows a client device manager in accordance with one or more embodiments of the invention. The client device manager (102) may include a manager kernel (120), a device state monitor (122), an asset state monitor (124), a client device interface (126), a data repository (128), a registry updater (138), and a backup storage interface (140). Each of these client device manager (102) components is described below.

In one embodiment of the invention, the manager kernel (120) may refer to a physical computer processor (e.g., an integrated circuit capable of processing computer instructions), a computer program executing on a physical computer processor, or a combination thereof, which may be designed and configured to oversee client device manager (102) operations. Accordingly, the manager kernel (120) may include functionality to: obtain client device (104A-104N) operational state from the device state monitor (122); obtain asset (or database) operational state from the asset state monitor (124); determine whether a given client device (104A-104N) may be unresponsive based on the obtained client device (104A-104N) operational state, or whether a given asset exhibits an abnormality based on the obtained asset operational state; and initiate, as well as oversee, the procedure to live-mount asset golden copies, at least in part, due to the unresponsiveness of a given client device (104A-104N) or the exhibition of an abnormality by a given asset. One of ordinary skill will appreciate that the manager kernel (120) may perform other functionalities without departing from the scope of the invention.

In one embodiment of the invention, the device state monitor (122) may refer to a computer program that may execute on the underlying hardware of the client device manager (102). Specifically, the device state monitor (122) may be designed and configured to monitor the operational state of the client device(s) (104A-104N) via the client device interface (126) and over the network (106). To that extent, the device state monitor (122) may employ, for example, a heartbeat protocol to periodically assess client device (104A-104N) state. Further, based on the monitoring, the device state monitor (122) may include functionality to detect whether a given client device (104A-104N) may be responsive or unresponsive and, subsequently, report the operational state of the given client device (104A-104N) to the manager kernel (120). One of ordinary skill will appreciate that the device state monitor (122) may employ other protocols or techniques to determine client device (104A-104N) state, and/or may perform other functionalities, without departing from the scope of the invention.

In one embodiment of the invention, the asset state monitor (124) may refer to a computer program that may execute on the underlying hardware of the client device manager (102). Specifically, the asset state monitor (124) may be designed and configured to monitor the operational state of one or more assets (or databases) residing on the client device(s) (104A-104N) via the client device interface (126) and over the network (106). To that extent, the asset state monitor (124) may employ one or more asset health checking tools, or rely on daemons (i.e., background services or agents) executing on the client device(s) (104A-104N), to periodically assess asset state. Further, based on the monitoring, the asset state monitor (124) may include functionality to detect whether a given asset may or may not exhibit operational abnormalities (e.g., errors, failures, etc.) and, subsequently, report the operational state of the given asset to the manager kernel (120). One of ordinary skill will appreciate that the asset state monitor (124) may employ other methodologies to determine asset state, and/or may perform other functionalities, without departing from the scope of the invention.

In one embodiment of the invention, the client device interface (126) may refer to a physical device, a computer program executing on the physical device, or a combination thereof, which may be designed and configured to enable communications between the client device manager (102) and the client device(s) (104A-104N). Accordingly, the client device interface (126) may enable communications through the employment of one or more subroutine definitions, protocols, and/or tools. By way of an example, the client device interface (126) may be implemented using physical computer networking hardware—e.g., one or more network interface cards or network adapters. By way of another example, the client device interface (126) may be implemented through a logical web application programming interface (API).

In one embodiment of the invention, the data repository (128) may refer to physical data storage (e.g., a collection of one or more physical storage devices (not shown)) on which various forms of digital data may be consolidated. The physical data storage may encompass non-transitory computer readable storage media on which data may be stored in whole or in part, and temporarily or permanently. Further, the physical data storage may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the data repository (128) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, a proxy pool (130) may be stored in the data repository (128). The proxy pool (130) may represent a data object (e.g., file) or a data structure within which proxy client device (104A-104N) metadata, for one or more proxy client devices (104A-104N), may be maintained. A proxy client device (104A-104N) may refer to a standby (i.e., unused or unallocated) client device (104A-104N) that may be brought online to host one or more live-mounted (described below) (see e.g., FIG. 1C) asset (or database) golden copies. Further, a proxy client device (104A-104N) may stand-in for, and thus assume hosting responsibilities from, any given active client device (104A-104N) that: (a) may have become unresponsive; or (b) may have once hosted at least one asset whereon an asset abnormality had been detected. Moreover, proxy client device (104A-104N) metadata—for a given proxy client device (104A-104N)—may include, but is not limited to: a global device identifier assigned to the proxy client device (104A-104N); a network (e.g., Internet Protocol (IP)) address assigned to the given proxy client device (104A-104N); a network port number on which the given proxy client device (104A-104N) may accept connection requests and/or instructions; and a specification of one or more resources (e.g., computing, memory, storage, virtualization, network bandwidth, etc.) installed on the given proxy client device (104A-104N).

In one embodiment of the invention, one or more auto-mount policies (132) may be stored in the data repository (128). An auto-mount policy may represent a course of action schema that triggers the automatic live-mounting of one or more asset golden copies, for one or more assets, respectively, should certain conditions, outlined in the auto-mount policy, befall the asset(s) or the client device(s) on which the asset(s) reside(d). Further, any stored auto-mount policy (132) may map to a given active (i.e., not proxy) client device (104A-104N), however, not all active client devices (104A-104N) (and their respective asset(s)) may be covered under an auto-mount policy (132). Discretion of which active client devices (104A-104N) may be associated with an auto-mount policy (132) may be contingent on the system (100), datacenter, and/or client device (104A-104N) administrator.

In one embodiment of the invention, an auto-mount policy (132) may, more specifically, map to the global device identifier (e.g., serial number) of a given active client device (104A-104N). Furthermore, each auto-mount policy (132) may include at least two clauses—an unresponsiveness clause and an asset abnormality clause (both not shown). A clause may refer to a provision of an auto-mount policy (132) that defines the scope of the data recovery coverage, if any, extended to the given active client device (104A-104N) should certain events occur. Though each auto-mount policy (132) includes at least these two aforementioned clause types, not all active client devices (104A-104N) may be extended data recovery coverage offered under them. That is, a given active client device (104A-104N)—having been associated with an auto-mount policy (132)—may be auto-mount enrolled under both clause type or, alternatively, one clause type or the other. Moreover, each of the aforementioned clause types is described below.

In one embodiment of the invention, the unresponsiveness clause may refer to an auto-mount policy (132) provision that particularly defines the scope of the data recovery coverage, extended to a given client device (104A-104N), should the given client device (104A-104N) become unresponsive. The responsiveness (or operational state) of the given client device (104A-104N) may be determined based on the continuous monitoring of the given client device (104A-104N) by the device state monitor (122) (described above). Should the given client device (104A-104N) become unresponsive, an examination of an auto-mount policy (132) (if any) for the given client device (104A-104N), as well as an examination of the unresponsiveness clause therein, may be triggered.

In one embodiment of the invention, the unresponsiveness clause may disclose respective values, configured for the given client device (104A-104N), to a set of attributes specified thereunder. The set of attributes may include, but is not limited to: (a) an auto-mount enrollment attribute indicative of whether the given client device (104A-104N) is configured for automatic asset data recovery at least with respect to when the given client device (104A-104N) becomes unresponsive; (b) a protected assets attribute indicative of a set (or subset) of assets, residing on the given client device (104A-104N), that are configured for automatic asset data recovery; and (c) a target client device attribute indicative that the target device onto which the asset(s) (identified in (b)) is/are to be recovered is a proxy client device (described above) selected from the proxy pool (130). One of ordinary skill will appreciate that additional or alternative attributes may be specified under the unresponsiveness clause without departing from the scope of the invention.

In one embodiment of the invention, the asset abnormality clause may refer to an auto-mount policy (132) provision that particularly defines the scope of the data recovery coverage, extended to the given client device (104A-104N), should at least one asset, residing on the given client device (104A-104N), exhibit or experience an asset abnormality (described below). Detection of one or more asset abnormalities exhibited or experienced by a given asset on the given client device (104A-104N) may be determined based on the continuous monitoring of the asset(s) by the asset state monitor (124) (described above). Should a given asset of the given client device (104A-104N) exhibit or experience an asset abnormality, an examination of an auto-mount policy (132) (if any) for the given client device (104A-104N), as well as an examination of the asset abnormality clause therein, may be triggered.

In one embodiment of the invention, the asset abnormality clause may disclose respective values, configured for the given client device (104A-104N), to a set of attributes specified thereunder. The set of attributes may include, but is not limited to: (a) an auto-mount enrollment attribute indicative of whether the given client device (104A-104N) is configured for automatic asset data recovery at least with respect to when any given asset, residing on the given client device (104A-104N), exhibits or experiences at least one asset abnormality; (b) a protected assets attribute indicative of a set (or subset) of assets—including or not including the aforementioned given asset—residing on the given client device (104A-104N), that are configured for automatic asset data recovery; (c) a trigger abnormalities attribute indicative of a set of asset abnormalities, required to be exhibited or experienced by the given asset, to trigger automatic asset data recovery; and (d) a target client device attribute indicative of the target device—e.g., the given client device (104A-104N) or a proxy client device (described above) selected from the proxy pool (130) —onto which the given asset is to be recovered. One of ordinary skill will appreciate that additional or alternative attributes may be specified under the asset abnormality clause without departing from the scope of the invention.

In one embodiment of the invention, a golden copy registry (124) may be stored in the data repository (128). The golden copy registry (124) may represent a data object (e.g., file) or a data structure within which asset golden copy metadata for one or more asset golden copies may be maintained. An asset golden copy may represent a pointer-based snapshot of a selected data file (described below) (see e.g., FIG. 1C) maintained by/on a backup asset (described below) (see e.g, FIG. 1D), corresponding to an asset, which may reside on the backup storage system (108). Specifically, an asset golden copy may retain a given asset state, of an asset, from which asset data recovery may depend.

In one embodiment of the invention, the golden copy registry (124) may index asset golden copy metadata, respective to a given asset, based on a global asset identifier (e.g., name) assigned to the given asset. Further, the asset golden copy metadata, maintained in the golden copy registry (124) for a given asset, may include, but is not limited to: a global backup asset identifier assigned to a backup asset (see e.g., FIG. 1D) on which the asset golden copy of the given asset may be maintained; a global asset golden copy identifier assigned to the asset golden copy of the given asset; and a directory path, in a backup file system (see e.g., FIG. 1D), at which the asset golden copy may be stored on the backup storage system (106).

In one embodiment of the invention, one or more device-asset mappings (136) may be stored in the data repository (128). A device-asset mapping (136) may refer to a key-value pair associating a given client device (104A-104N) to a set of assets known to be residing thereon. More specifically, each device-asset mapping (136) may include, for example, a global client device identifier for a given client device (104A-104a), which may be representative of the key in the key-value pair; and one or more global asset identifiers for one or more assets residing on the given client device (104A-104N), which may be representative of the value in the key-value pair.

In one embodiment of the invention, the registry updater (138) may refer to a computer program that may execute on the underlying hardware of the client device manager (102). Specifically, the registry updater (138) may be designed and configured to maintain the golden copy registry (134). To that extent, the registry updater (138) may include functionality to: receive asset golden copy updates from the backup storage system (140) via the backup storage interface (140) and over the network (106); and update the golden copy registry (134) using the received asset golden copy updates. An asset golden copy update for a given asset golden copy may include, but is not limited to the following information: a global asset identifier (e.g., name) assigned to a given asset with which the given asset golden copy is associated; a global backup asset identifier assigned to a backup asset (see e.g., FIG. 1D) on which the given asset golden copy may be maintained; a global asset golden copy identifier assigned to the given asset golden copy; and a directory path, in a backup file system (see e.g., FIG. 1D), at which the given asset golden copy may be stored on the backup storage system (106). One of ordinary skill will appreciate that the registry updater (138) may perform other functionalities without departing from the scope of the invention.

In one embodiment of the invention, the backup storage interface (140) may refer to a physical device, a computer program executing on the physical device, or a combination thereof, which may be designed and configured to enable communications between the client device manager (102) and the backup storage system (108). Accordingly, the backup storage interface (140) may enable communications through the employment of one or more subroutine definitions, protocols, and/or tools. By way of an example, the backup storage interface (140) may be implemented using physical computer networking hardware—e.g., one or more network interface cards or network adapters. By way of another example, the backup storage interface (140) may be implemented through a logical web application programming interface (API).

While FIG. 1B shows a configuration of components, other client device manager (102) configurations may be used without departing from the scope of the invention.

Figure 1C:
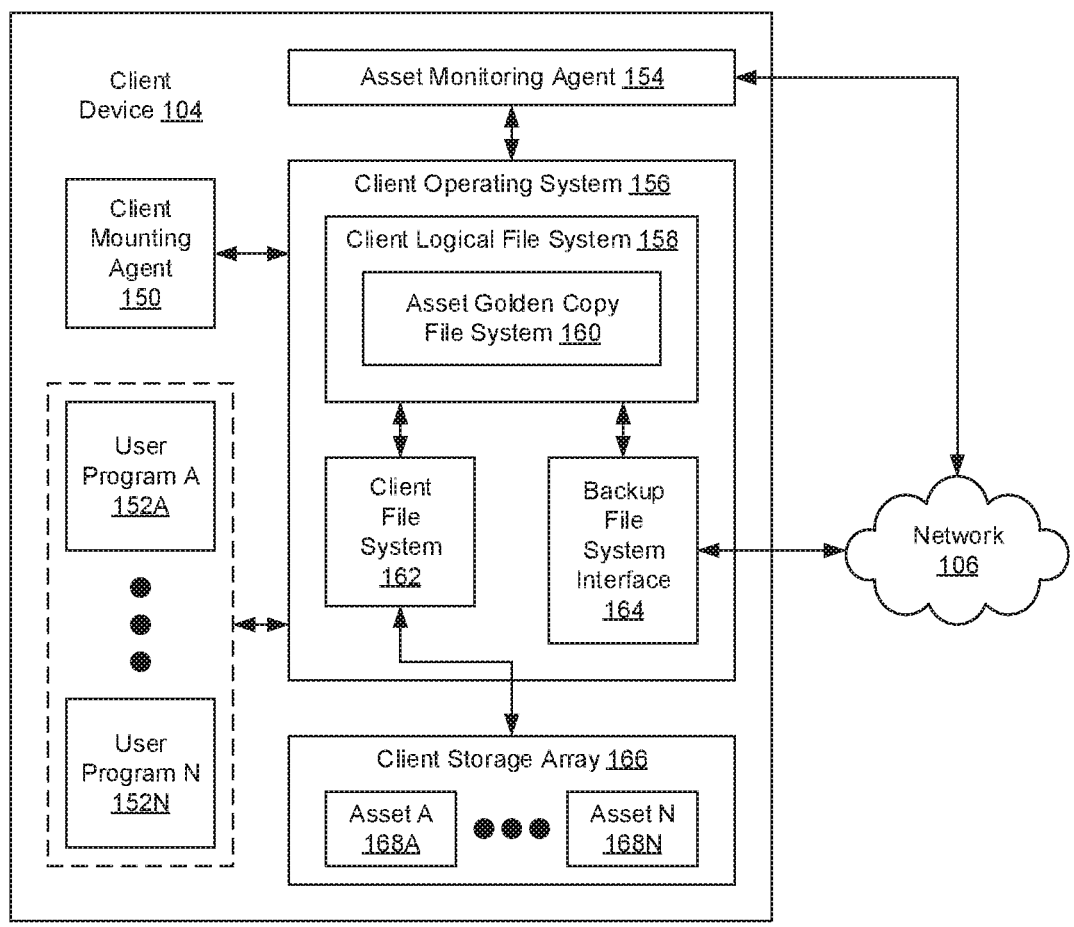

FIG. 1C shows a client device in accordance with one or more embodiments of the invention. The client device (104) may include a client mounting agent (150), one or more user programs (152A-152N), an asset monitoring agent (154), a client operating system (156), and a client storage array (166). Each of these client device (104) components is described below.

In one embodiment of the invention, the client mounting agent (150) may refer to a computer program that may execute on the underlying hardware of the client device (104). Specifically, the client mounting agent (150) may be designed and configured to perform client-side database mounting operations. To that extent, the client mounting agent (150) may include functionality to perform the various steps outlined below with respect to FIG. 6, which may be directed to live-mounting (described below) backup database data on the client device (104). One of ordinary skill will appreciate that the client mounting agent (150) may perform other functionalities without departing from the scope of the invention.

In one embodiment of the invention, live-mounting may refer to a data recovery mechanism that provides the restoration of databases—in entirety or at any granular level—without needing to provision storage resources for point-in-time database copies (i.e., backup database data), or without needing to wait for large amounts of data, representative of the point-in-time database copies, to traverse the network (106) from the backup storage system (108) to the client device (104). Substantively, through live-mounting, the physical point-in-time database data, as well as the structural metadata descriptive of the backup database(s) (e.g., control file(s) (described below)), may be retained on the backup storage system (108) while a pointer-based snapshot, mapping to the physical point-in-time database data and structural metadata, may be generated thereon. Thereafter, a file system—mapping to the pointer-based snapshot created on the backup storage system (108)—may be mounted on the client device (104). The mounted file system exposes an interface through which one or more user programs (152A-152N) may access and manipulate (i.e., perform file operations on) the created pointer-based snapshot on the backup storage system (108). Meanwhile, a distributed file system protocol may be employed between the client device (104) and the backup storage system (108) to facilitate the backup database data interaction.

In one embodiment of the invention, a user program (152A-152N) may refer to a computer program that may execute on the underlying hardware of the client device (104). Specifically, a user program (152A-152N) may be designed and configured to perform one or more functions, tasks, and/or activities instantiated by a user of the client device (104). Accordingly, towards performing these operations, a user program (152A-152N) may include functionality to request and consume client device (104) resources (e.g., computer processors, memory, storage (166), virtualization, network bandwidth, etc.) by way of service calls to the client operating system (156). One of ordinary skill will appreciate that a user program (152A-152N) may perform other functionalities without departing from the scope of the invention. Examples of a user program (152A-152N) may include, but are not limited to, a word processor, an email client, a database client, a web browser, a media player, a file viewer, an image editor, a simulator, a computer game, or any other computer executable application.

In one embodiment of the invention, the asset monitoring agent (154) may refer to a computer program that may execute on the underlying hardware of the client device (104). Specifically, the asset monitoring agent (154) may be designed and configured to aggregate one or more indicators pertinent to ascertaining asset current asset (168A-168N) state exhibited or experienced by the asset(s) (168A-168N) residing on the client device (104). To that extent, the asset monitoring agent (154) may include functionality to: probe the asset(s) (168A-168N), and/or prompt one or more logical sensors (not shown) monitoring aspects of the asset(s) (168A-168N), to collect the aforementioned indicator(s); and transmit the indicator(s) to the client device manager (102) through the network (106). One of ordinary skill will appreciate that the asset monitoring agent (154) may perform other functionalities without departing from the scope of the invention.

In one embodiment of the invention, the client operating system (156) may refer to a computer program that may execute on the underlying hardware of the client device (104). Specifically, the client operating system (156) may be designed and configured to oversee client device (104) operations. To that extent, the client operating system (156) may include functionality to, for example, support fundamental client device (104) functions; schedule tasks; mediate interactivity between logical (e.g., software) and physical (e.g., hardware) client device (104) components; allocate client device (104) resources; and execute or invoke other computer programs executing on the client device (104). One of ordinary skill will appreciate that the client operating system (156) may perform other functionalities without departing from the scope of the invention.

For example, the client operating system (156) may facilitate user program (152A-152N) interaction with asset (168A-168N) data stored locally on the client device (104) or remotely over the network (106). In facilitating the aforementioned interaction, the client operating system (156) may implement a client logical file system (158). The client logical file system (158) may represent a collection of in-memory data structures maintained, by the client operating system (156), to manage the various accessible asset (168A-168N) data stored locally on the client device (104) and/or remotely on the backup storage system (108). Further, the client logical file system (158) may expose an application programming interface (API) through which the user program(s) (152A-152N) may manipulate—i.e., via one or more file operations—any granularity of locally and/or remotely stored asset (168A-168N) data. These file operations, requested by the user program(s) (152A-152N), may subsequently be delivered to the client file system (162) or the backup file system interface (164) for processing.

In one embodiment of the invention, one or more asset golden copy file systems (160) may be mounted, at respective mount points, in the client logical file system (158). An asset golden copy file system (160), similar to the client logical file system (158), may refer to a collection of in-memory data structures that may be used to organize and manage backup database data retained in a given asset golden copy (described above) (see e.g., FIG. 1B). Further, a mount point may refer to a directory path through which the aforementioned backup database data, retained in a given asset golden copy, may be accessed logically by one or more user programs (152A-152N). Moreover, live-mounting (described above) may be employed to incorporate the asset golden copy file system(s) (160) and maintain the file operations requesting and servicing interactivity between the user program(s) (152A-152N) executing on the client device (104) and the asset golden copy residing on the backup storage system (108).

In one embodiment of the invention, the client file system (162) may represent a physical file system (also referred to as a file system implementation). A physical file system may refer to a collection of subroutines concerned with the physical operation of one or more physical storage devices (described below). The client file system (162), in this respect, may be concerned with the physical operation of the client storage array (166). Accordingly, the client file system (162) may employ client storage array (166) device drivers (or firmware) to process requested file operations from the user program(s) (152A-152N). Device drivers enable the client file system (162) to manipulate physical storage or disk blocks as appropriate.

In one embodiment of the invention, the backup file system interface (164) may represent a computer program that may execute on the underlying hardware of the client device (104). Specifically, the backup file system interface (164) may be designed and configured to facilitate the access and manipulation of remotely stored database data as if the aforementioned database data were stored locally on the client device (104). Accordingly, the backup file system interface (164) may, in part, implement a distributed file system (DFS), which may employ any known distributed file system protocol (e.g., the network file system (NFS) protocol). A distributed file system may refer to a mechanism through which files (e.g., database data) may be stored and accessed based on client-server architecture over a network (106). Particularly, in a distributed file system, one or more central appliances (e.g., the backup storage system (108)) store files that can be accessed, with proper authorization permissions, by any number of remote clients (e.g., the client device (104)) across the network (106). Furthermore, the backup file system interface (164) may include functionality to issue remote procedure calls (RPCs) directed to accessing and manipulating any granularity of database data remotely stored on the backup storage system (108).

In one embodiment of the invention, the client storage array (166) may refer to a collection of one or more physical storage devices (not shown) on which various forms of digital data—e.g., one or more assets (168A-168N) (described below) —may be consolidated. Each physical storage device may encompass non-transitory computer readable storage media on which data may be stored in whole or in part, and temporarily or permanently. Further, each physical storage device may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the client storage array (166) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, an asset (168A-168N) may represent a database, or a logical container to and from which related digital data may be stored and retrieved, respectively. An asset (168A-168N) may occupy a portion of a physical storage device or, alternatively, may span across multiple physical storage devices, of the client storage array (166). Furthermore, an asset (168A-168N) may refer to a composite of various database objects including, but not limited to, one or more data files, one or more control files, and one or more redo log files (all not shown). Each of these asset (168A-168N) subcomponents is described below.

In one embodiment of the invention, a data file may refer to a database object for storing database data. Database data may encompass computer readable content (e.g., images, text, video, audio, machine code, any other form of computer readable content, or a combination thereof), which may be generated, interpreted, and/or processed by any given user program (152A-152N). Further, a data file may store database data in (a) undeduplicated form or (b) deduplicated form. In brief, the latter form of database data may be produced through the application of data deduplication on the former form of the database data. That is, undeduplicated database data may entail computer readable content that may or may not include redundant information. In contrast, deduplicated database data may result from the elimination of any redundant information and, accordingly, may instead reflect a content recipe of the undeduplicated computer readable content. A content recipe may refer to a sequence of chunk identifiers (or pointers) associated with (or directed to) unique database data chunks consolidated in physical storage. Collectively, the sequence of chunk identifiers (or pointers) —representative of the deduplicated database data—may be used to reconstruct the corresponding undeduplicated database data. Moreover, a given chunk identifier for a given database data chunk may encompass a cryptographic fingerprint or hash of the given database data chunk.

In one embodiment of the invention, a control file may refer to a database object for storing asset (168A-168N) metadata (also referred to as database metadata). Database metadata may encompass information descriptive of the database (or asset (168A-168N)) status and structure. By way of examples, database metadata may include, but are not limited to, a database name assigned to the asset (168A-168N), the name(s) and storage location(s) of one or more data files and redo log files associated with the asset (168A-168N), a creation timestamp encoding the date and/or time marking the creation of the asset (168A-168N), a log sequence number associated with a current redo log file, etc.

In one embodiment of the invention, a redo log file may refer to a database object for storing a history of changes made to the database data. A redo log file may include one or more redo entries (or redo records), which may include a set of change vectors. Each change vector subsequently describes or represents a modification made to a single asset (168A-168N) data block. Furthermore, a redo log file may serve to recover the asset (168A-168N) should a failover occur, or to apply recent changes to a recovered asset (168A-168N) which may have transpired during the database recovery process.

While FIG. 1C shows a configuration of components, other client device (104) configurations may be used without departing from the scope of the invention.

Figure 1D:
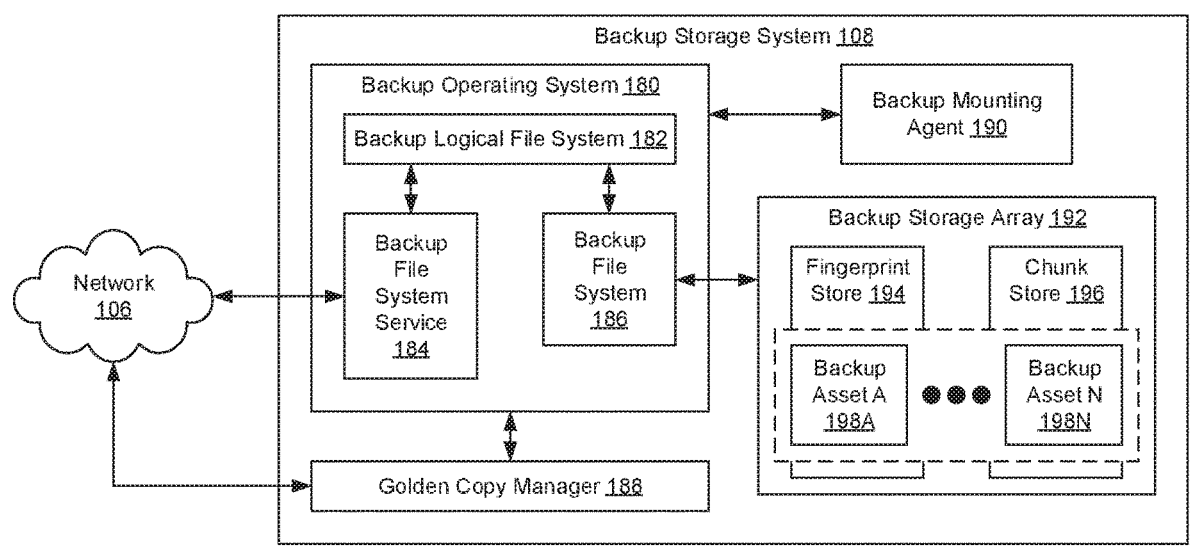

FIG. 1D shows a backup storage system in accordance with one or more embodiments of the invention. The backup storage system (108) may include a backup operating system (180), a golden copy manager (188), a backup mounting agent (190), and a backup storage array (192). Each of these backup storage system (108) components is described below.

In one embodiment of the invention, the backup operating system (180) may refer to a computer program that may execute on the underlying hardware of the backup storage system (108). Specifically, the backup operating system (180) may be designed and configured to oversee backup storage system (108) operations. To that extent, the backup operating system (180) may include functionality to, for example, support fundamental backup storage system (108) functions; schedule tasks; mediate interactivity between logical (e.g., software) and physical (e.g., hardware) backup storage system (108) components; allocate backup storage system (108) resources; and execute or invoke other computer programs executing on the backup storage system (108). One of ordinary skill will appreciate that the backup operating system (180) may perform other functionalities without departing from the scope of the invention.

For example, the backup operating system (180) may facilitate backup asset (198A-198N) access and manipulation by one or more computer programs (e.g., golden copy manager (188) and backup mounting agent (190)) executing locally on the backup storage system (108) or, alternatively, by one or more remote computing systems (e.g., client device(s) (104A-104N)) over the network (106). In facilitating the aforementioned interaction, the backup operating system (180) may implement a backup logical file system (182). The backup logical file system (182) may represent a collection of in-memory data structures maintained, by the backup operating system (180), to manage the various accessible backup asset (198A-198N) data stored locally on the backup storage system (108). Further, the backup logical file system (182) may expose an application programming interface (API) through which the local computer programs and/or remote computing systems may manipulate—i.e., via one or more file operations—any granularity of locally stored backup asset (198A-198N) data. File operations, requested by the local computer programs, may be delivered to the backup file system (186) for processing, whereas file operations, requested by the remote computing systems, may be received and processed by the backup file system service (184).

In one embodiment of the invention, the backup file system service (184) may represent a computer program that may execute on the underlying hardware of the backup storage system (108). Specifically, the backup file system service (184) may be designed and configured to facilitate the authorized, remote access and manipulation of locally stored backup database data. Accordingly, the backup file system service (184) may, in part, implement a distributed file system (DFS), which may employ any known distributed file system protocol (e.g., the network file system (NFS) protocol). A distributed file system may refer to a mechanism through which files (e.g., database data) may be stored and accessed based on client-server architecture over a network (106). Particularly, in a distributed file system, one or more central appliances (e.g., the backup storage system (108)) store files that can be accessed, with proper authorization permissions, by any number of remote clients (e.g., the client device(s) (104A-104N)) across the network (106). Furthermore, the backup file system service (184) may include functionality to service remote procedure calls (RPCs) directed to accessing and manipulating any granularity of backup database data locally stored on the backup storage system (108).

In one embodiment of the invention, the backup file system (186) may represent a physical file system (also referred to as a file system implementation). A physical file system may refer to a collection of subroutines concerned with the physical operation of one or more physical storage devices (described below). The backup file system (186), in this respect, may be concerned with the physical operation of the backup storage array (192). Accordingly, the backup file system (186) may employ backup storage array (192) device drivers (or firmware) to process requested file operations from the local computer programs or the remote computing systems (via the backup file system service (184)). Device drivers enable the backup file system (186) to manipulate physical storage or disk blocks as appropriate.

In one embodiment of the invention, the golden copy manager (188) may refer to a computer program that may execute on the underlying hardware of the backup storage system (108). Specifically, the golden copy manager (188) may be designed and configured to manage one or more asset golden copies, maintained on the backup storage system (108), based on asset data recovery configurations prescribed by a system (100), datacenter, and/or client device (104A-104N) administrator. To that extent, for any given asset (168A-168N) on any given client device (104A-104N), the golden copy manager (188) may include functionality to: identify a data file (described above) (see e.g., FIG. 1C) of the given asset (168A-168N), which may have been replicated and consolidated in a respective given backup asset (198A-198N) for the given asset (168A-168N), based on asset golden copy criteria outlined in an asset data recovery configuration for the given client device (104A-104N); generate (or update) the asset golden copy for the given asset (168A-168N) by cloning the identified data file, thereby producing a pointer-based snapshot of the identified data file representative of the asset golden copy; maintain (or update) asset golden copy metadata (described above) (see e.g., FIG. 1B) associated with the generated/updated asset golden copy; and transmit the maintained/updated asset golden copy metadata to the client device manager (102) for recordation. One of ordinary skill will appreciate that the golden copy manager (188) may perform other functionalities without departing from the scope of the invention.

In one embodiment of the invention, the backup mounting agent (190) may refer to a computer program that may execute on the underlying hardware of the backup storage system (108). Specifically, the backup mounting agent (190) may be designed and configured to perform server-side database mounting operations. To that extent, the backup mounting agent (190) may include functionality to perform the various steps outlined below with respect to FIG. 5, which may be directed to servicing a live mount (described above) connection request from a client device (104A-104N). One of ordinary skill will appreciate that the backup mounting agent (190) may perform other functionalities without departing from the scope of the invention.

In one embodiment of the invention, the backup storage array (192) may refer to a collection of one or more physical storage devices (not shown) on which various forms of digital data—e.g., one or more backup assets (198A-198N) (described below) —may be consolidated. Each physical storage device may encompass non-transitory computer readable storage media on which data may be stored in whole or in part, and temporarily or permanently. Further, each physical storage device may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the backup storage array (192) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the backup storage array (192) may include a fingerprint store (194) and a chunk store (196), which may collectively consolidate deduplicated database data. Recall from above (see e.g., FIG. 1C), that deduplicated database data may result from the elimination of any redundant information found throughout the database data in undeduplicated form. Accordingly, instead of reflecting the binary composition of the undeduplicated database data in its entirety, deduplicated database data may alternatively reflect reduced information in the form of a content recipe of the representative, undeduplicated computer readable content. The aforementioned content recipe may refer to a sequence of chunk identifiers (or pointers) associated with (or directed to) unique database data chunks identified throughout the undeduplicated database data. Any unique database data chunks, along with their respective chunk identifiers (i.e., cryptographic fingerprints or hashes), may be indexed in appropriate physical storages—e.g., the chunk store (196) and the fingerprint store (194), respectively.

In one embodiment of the invention, the fingerprint store (194) may represent a repository for maintaining chunk identifiers. Each chunk identifier may be indexed by way of a fingerprint store (194) entry (not shown), which may store a mapping relating the chunk identifier to a storage identifier. A chunk identifier (also referred to as a fingerprint or hash) may represent a digital signature that uniquely identifies an associated database data chunk. Further, a chunk identifier may be produced by submitting the associated database data chunk through a hash function, which may employ any existing cryptographic mapping algorithm. As such, a chunk identifier may be outputted by the hash function given the associated database data chunk as input. Meanwhile, a storage identifier may represent a character or bit string that uniquely identifies a storage location in the backup storage array (192). By way of an example, a storage identifier may encompass a tuple reflecting (a) a storage device identifier uniquely assigned to a given physical storage device (not shown) of the backup storage array (192); and (b) a binary address assigned to a starting byte (or storage block) in the given physical storage device at which the database data chunk may be physically stored.

On the other hand, in one embodiment of the invention, the chunk store (196) may represent a repository for maintaining unique database data chunks. Each unique database data chunk may be indexed by way of a chunk store (196) entry (not shown), which may store a mapping relating a storage identifier (described above) to the unique database data chunk. A database data chunk may refer to a fragment or a partition of undeduplicated database data. More specifically, a database data chunk may capture a unique byte pattern that may occur or recur throughout the undeduplicated database data.

In one embodiment of the invention, a backup asset (198A-198N) may refer to a deduplicated backup copy of a given asset (168A-168N) (see e.g., FIG. 1C). Accordingly, a backup asset (198A-198N) may similarly represent a database, or a logical container to and from which related digital data, or any granularity thereof, may be stored and retrieved, respectively. A backup asset (198A-198N) may occupy a portion of a physical storage device or, alternatively, may span across multiple physical storage devices, of the backup storage array (192). Furthermore, similar to an asset (168A-168N), a backup asset (198A-198N) may refer to a composite of various database objects including, but not limited to, one or more data files, one or more control files, and one or more redo log files (all described above).

In one embodiment of the invention, at least one data file of each backup asset (198A-198N) may represent an asset golden copy (not shown). An asset golden copy may represent a pointer-based snapshot of another, selected data file by/on a given backup asset (198A-198N). Specifically, an asset golden copy may retain a given asset state, of a given asset (168A-168N) on a client device (104A-104N), which may be maintained in a backup asset (198A-198N) respective to the given asset (168A-168N) and from which asset data recovery may depend. Furthermore, the given asset state—recorded by the asset golden copy—for the given asset (168A-168N) may be reflective of asset golden copy criteria outlined in an asset data recovery configuration prescribed by a system (100), datacenter, or client device (104A-104N) administrator.

While FIG. 1D shows a configuration of components, other backup storage system (108) configurations may be used without departing from the scope of the invention.

Figure 2:
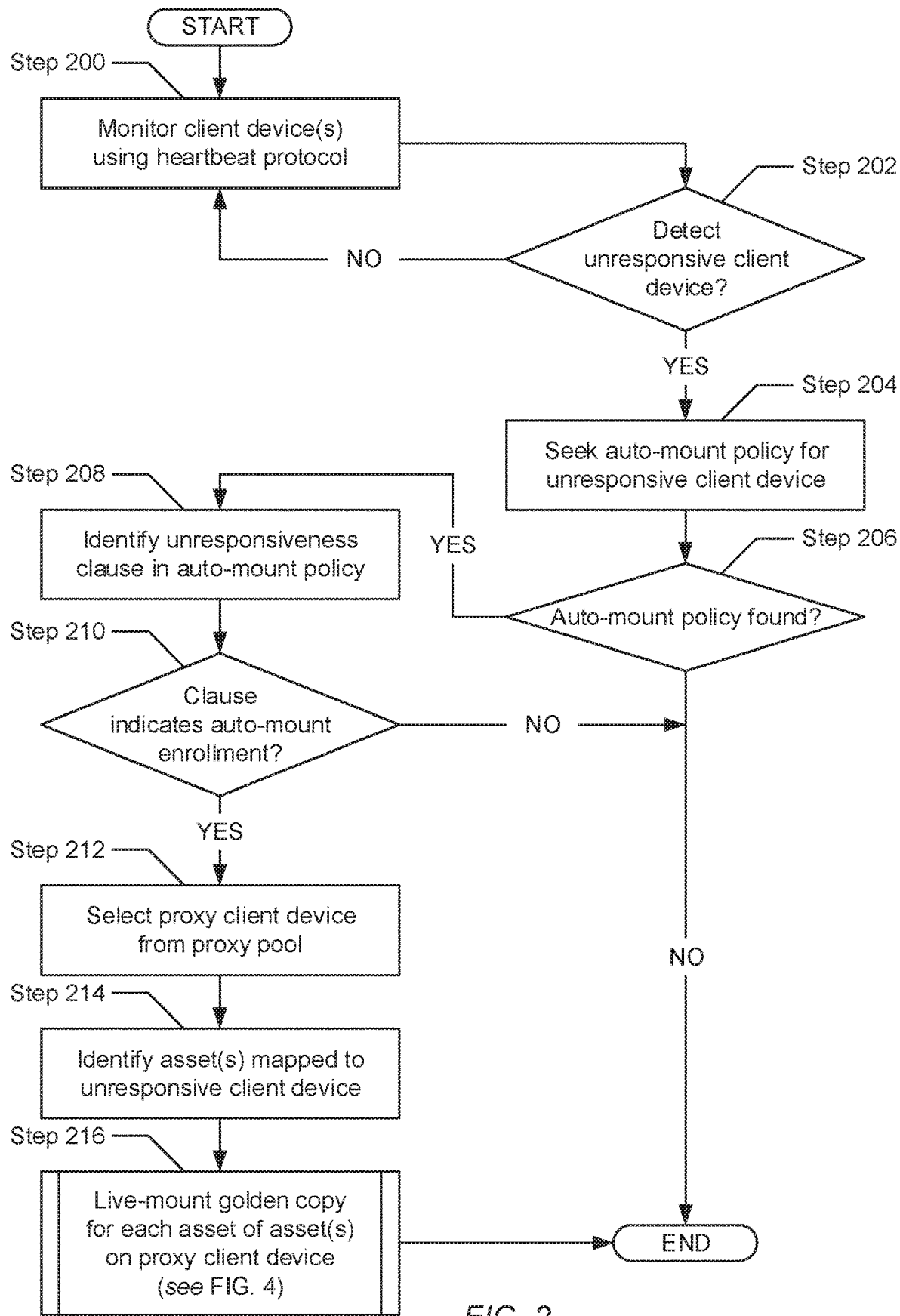
FIG. 2 shows a flowchart describing a method for handling unresponsive client devices in accordance with one or more embodiments of the invention.

FIG. 2 shows a flowchart describing a method for handling unresponsive client devices in accordance with one or more embodiments of the invention. The various steps outlined below may be performed by the client device manager (see e.g., FIGS. 1A and 1B). Further, while the various steps in the flowcharts are presented and described sequentially, one of ordinary skill will appreciate that some or all steps may be executed in different orders, may be combined or omitted, and some or all steps may be executed in parallel.

Turning to FIG. 2, in Step 200, one or more client devices (see e.g., FIGS. 1A and 1C) is/are monitored. In one embodiment of the invention, monitoring of the client device(s) may employ, for example, a heartbeat protocol between the client device manager and the client device(s). Generally, a heartbeat protocol may entail the periodic exchange of heartbeat messages, between two computing systems over a network, which are intended to indicate the health (or operational state) of either computing system.

In Step 202, a determination is made as to whether any given client device has become unresponsive. Through the above-mentioned heartbeat protocol, for example, the given client device may be labeled as unresponsive should the client device manager fail to receive a heartbeat message from the given client device for a prescribed number of heartbeat intervals (i.e., defined by a periodicity of the exchange of heartbeat messages). Accordingly, in one embodiment of the invention, if it is determined that a heartbeat message has not been received from a given client device for a prescribed span of time, then the given client device is labeled as unresponsive and the process proceeds to Step 204. On the other hand, in another embodiment of the invention, if it is alternatively determined that a heartbeat message has been received from a given client device within a prescribed span of time, then the given client device is labeled as responsive and the process alternatively proceeds to Step 200, where monitoring of the client device(s) continues.

In Step 204, after determining (in Step 202) that a given client device has become unresponsive, an auto-mount policy is sought for the given unresponsive client device. Specifically, in one embodiment of the invention, a lookup may be performed across a set of auto-mount policies stored in the data repository on the client device manager (see e.g., FIG. 1B) using unique metadata (e.g., a global client device identifier) associated with the given unresponsive client device. Further, an auto-mount policy may represent a course of action schema that triggers the auto live-mounting of one or more asset golden copies, for one or more assets originally residing on a given client device, should certain conditions transpire.

In Step 206, a determination is made as to whether an auto-mount policy for the given unresponsive client device (detected in Step 202) has been found based on the data repository lookup (performed in Step 204). Accordingly, in one embodiment of the invention, if it is determined that an auto-mount policy has been found for the given unresponsive client device, then the process proceeds to Step 208. On the other hand, in another embodiment of the invention, if it is alternatively determined that no auto-mount policy exists for the given unresponsive client device, then the process alternatively ends.

In Step 208, after determining (in Step 206), based on the lookup (performed in Step 204), that an auto-mount policy for the given unresponsive client device (detected in Step 202) exists, the auto-mount policy is examined to identify an unresponsiveness clause. In one embodiment of the invention, an unresponsiveness clause may refer to an auto-mount policy provision that particularly defines the scope of the data recovery coverage, extended to a given client device, should the given client device become unresponsive.

In Step 210, a determination is made as to whether the unresponsiveness clause (identified in Step 208) indicates that the given unresponsive client device (detected in Step 202) is enrolled in the auto-mount service. The determination may entail examining an auto-mount enrollment attribute (described above) (see e.g., FIG. 1B) under the unresponsiveness clause. Accordingly, in one embodiment of the invention, if it is determined that the given unresponsive client device is indeed auto-mount enrolled, at least with respect to the unresponsiveness clause, then the process proceeds to Step 212. On the other hand, in another embodiment of the invention, if it is alternatively determined that the given unresponsive client device is not auto-mount enrolled, at least with respect to the unresponsiveness clause, then the process ends.

In Step 212, after determining (in Step 210) that the given unresponsive client device (detected in Step 202) is auto-mount enrolled, at least with respect to the unresponsiveness clause (identified in Step 208), a proxy client device is selected. In one embodiment of the invention, a proxy client device may refer to a standby (i.e., unused or unallocated) client device that may be brought online to host one or more live-mounted (described above) (see e.g., FIG. 1C) asset (or database) golden copies. Further, the proxy client device may be selected from a set of prescribed proxy client devices enumerated in a proxy pool residing on the client device manager (see e.g., FIG. 1B).

In Step 214, one or more assets, mapped to the given unresponsive client device (detected in Step 202), is/are identified. In one embodiment of the invention, identification of the asset(s) may entail performing a lookup across a set of device-asset mappings stored in the data repository on the client device manager (see e.g., FIG. 1B) using unique metadata (e.g., a global client device identifier) associated with the given unresponsive client device. In another embodiment of the invention, identification of the asset(s) may entail examining a protected assets attribute (described above) (see e.g., FIG. 1B) under the unresponsiveness clause (identified in Step 208) of the auto-mount policy (found in Step 206) for the given unresponsive client device.

In Step 216, one or more asset golden copies corresponding to the asset(s) (identified in Step 214), respectively, is/are live-mounted onto the proxy client device (selected in Step 212). In one embodiment of the invention, an asset golden copy may represent a pointer-based snapshot of a selected data file (described above) maintained by/on a backup asset, corresponding to an asset, which may reside on the backup storage system (see e.g., FIG. 1D). Specifically, an asset golden copy may retain a given asset state, of an asset, from which asset data recovery may depend. Live-mounting of the asset golden copy(ies) is described in further detail below with respect to FIG. 4.

Figure 3:
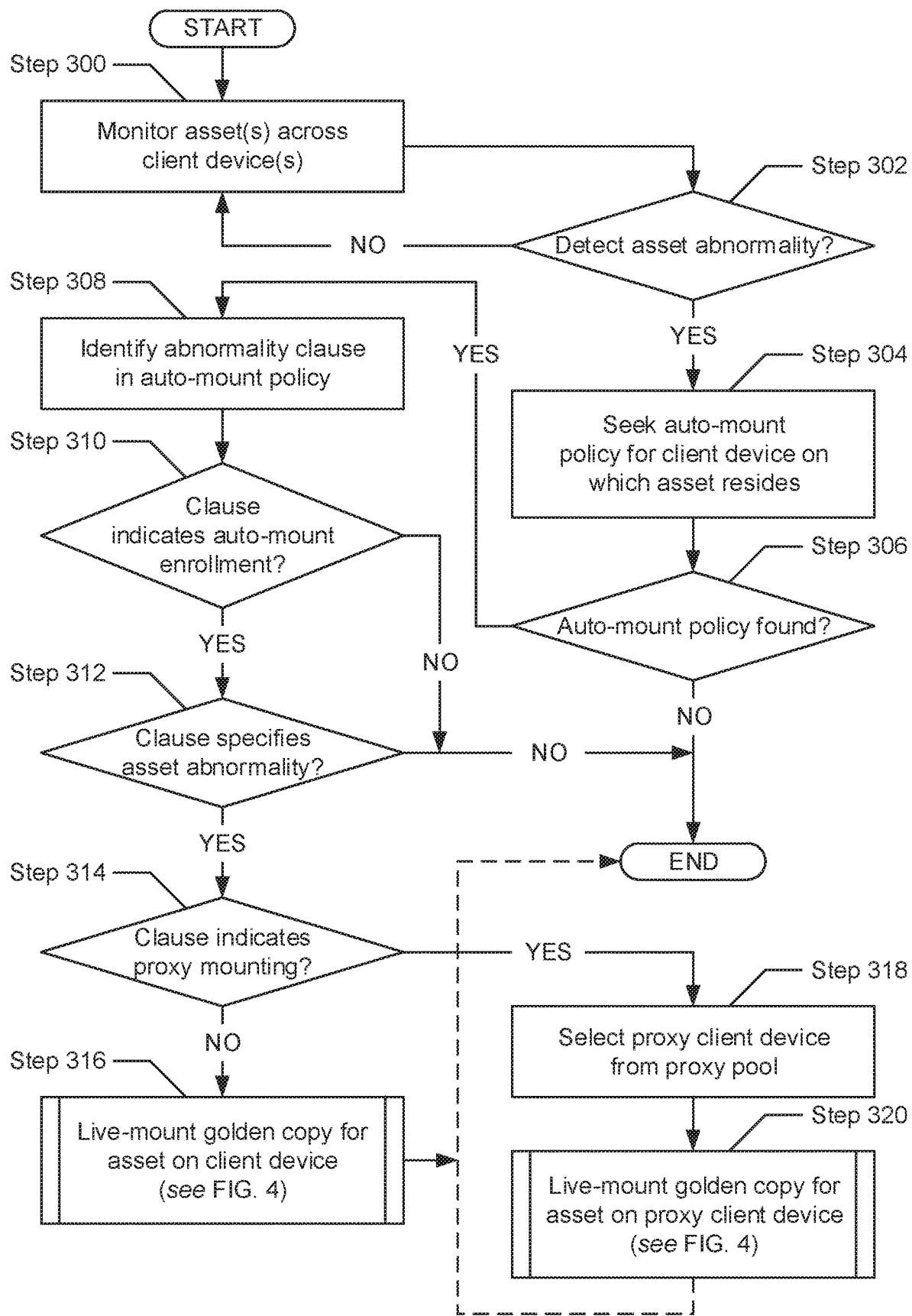
FIG. 3 shows a flowchart describing a method for handling operationally abnormal databases in accordance with one or more embodiments of the invention.

FIG. 3 shows a flowchart describing a method for handling operationally abnormal databases in accordance with one or more embodiments of the invention. The various steps outlined below may be performed by the client device manager (see e.g., FIGS. 1A and 1B). Further, while the various steps in the flowcharts are presented and described sequentially, one of ordinary skill will appreciate that some or all steps may be executed in different orders, may be combined or omitted, and some or all steps may be executed in parallel.

Turning to FIG. 3, in Step 300, one or more assets (i.e., databases), across one or more client devices, is/are monitored. In one embodiment of the invention, monitoring of the asset(s) may entail employing one or more database health checking (or diagnostic) tools. A database diagnostic tool may refer to a computer program specifically designed and configured to detect, and provide guidance pertaining to addressing, one or more issues or problems (also referred to as asset abnormalities) found during the operation of a given database. In another embodiment of the invention, monitoring of the asset(s) may additionally or alternatively entail relying on state collection daemons (i.e., background services) executing on the asset(s). A state collection daemon may refer to a computer program specifically designed and configured to periodically aggregate and report various database state variables, which may be used to derive any operational inconsistencies.

In Step 302, a determination is made as to whether any given asset is exhibiting an asset abnormality. Examples of asset abnormalities may include, but are not limited to: data file inaccessibility, data file corruption, data file inconsistency, disk image block corruption, control file inaccessibility, control file corruption, redo log inaccessibility, redo log corruption, network failure, user error failure, user process failure, transaction revalidation failure, dictionary integrity failure, and database structural integrity failure. Accordingly, in one embodiment of the invention, if it is determined, based on the monitoring (performed in Step 300), that any given asset is exhibiting (or experiencing) at least one asset abnormality, then the process proceeds to Step 304. On the other hand, in another embodiment of the invention, if it is alternatively determined that no asset abnormalities are being exhibited (or experienced) across the monitored asset(s), then the process alternatively proceeds to Step 300, where further asset monitoring is performed.

In Step 304, after determining (in Step 302) that a given asset is exhibiting (or experiencing) an asset abnormality, an auto-mount policy is sought for the client device on which the given asset resides. Specifically, in one embodiment of the invention, a lookup may be performed across a set of auto-mount policies stored in the data repository on the client device manager (see e.g., FIG. 1B) using unique metadata (e.g., a global client device identifier) associated with the aforementioned client device on which the given asset resides. Further, an auto-mount policy may represent a course of action schema that triggers the auto live-mounting of one or more asset golden copies, for one or more assets originally residing on a given client device, should certain conditions transpire.

In Step 306, a determination is made as to whether an auto-mount policy for the client device on which the given asset resides has been found based on the data repository lookup (performed in Step 304). Accordingly, in one embodiment of the invention, if it is determined that an auto-mount policy has been found for the aforementioned client device, then the process proceeds to Step 308. On the other hand, in another embodiment of the invention, if it is alternatively determined that no auto-mount policy exists for the aforementioned client device, then the process alternatively ends.

In Step 308, after determining (in Step 306), based on the lookup (performed in Step 304), that an auto-mount policy, for the client device on which the given asset resides, exists, the auto-mount policy is examined to identify an asset abnormality clause. In one embodiment of the invention, an asset abnormality clause may refer to an auto-mount policy provision that particularly defines the scope of the data recovery coverage, extended to a given client device, should the given client device exhibit (or experience) one or more asset abnormalities.

In Step 310, a determination is made as to whether the asset abnormality clause (identified in Step 308) indicates that the above-mentioned client device, on which the given asset resides, is enrolled in the auto-mount service. The determination may entail examining an auto-mount enrollment attribute (described above) (see e.g., FIG. 1B) specified under the asset abnormality clause. Accordingly, in one embodiment of the invention, if it is determined that the aforementioned client device is indeed auto-mount enrolled, at least with respect to the asset abnormality clause, then the process proceeds to Step 312. On the other hand, in another embodiment of the invention, if it is alternatively determined that the aforementioned client device is not auto-mount enrolled, at least with respect to the asset abnormality clause, then the process ends.

In Step 312, after determining (in Step 310) that the above-mentioned client device, on which the given asset resides, is auto-mount enrolled, at least with respect to the asset abnormality clause (identified in Step 308), a determination is made as to whether the asset abnormality (detected in Step 302) matches any trigger abnormalities specified under the asset abnormality clause. A trigger abnormality may refer to an asset abnormality, exhibited (or experienced) by a given asset, which may be configured to trigger the auto live-mounting of an asset golden copy of the given asset onto a target client device. Further, the determination may entail examining and, subsequently, comparing the detected asset abnormality against a trigger abnormalities attribute (described above) (see e.g., FIG. 1B) under the asset abnormality clause. Accordingly, in one embodiment of the invention, if it is determined that the detected asset abnormality matches any trigger abnormality, then the process proceeds to Step 314. On the other hand, in another embodiment of the invention, if it is alternatively determined that the detected asset abnormality matches none of the trigger abnormalities, then the process ends.

In Step 314, after determining (in Step 312) that the asset abnormality (detected in Step 302) matches any trigger abnormality specified under the asset abnormality clause (identified in Step 308), a determination is made as to whether the abnormality clause indicates live-mounting should be directed to a proxy client device. The determination may entail examining a target client device attribute (described above) (see e.g., FIG. 1B) under the asset abnormality clause. Accordingly, in one embodiment of the invention, if it is determined that the target client device of the live-mounting is the above-mentioned client device, on which the given asset resides, then the process proceeds to Step 316. On the other hand, if it is alternatively determined that the target client device of the live-mounting is a proxy client device, then the process alternatively proceeds to Step 318.

In Step 316, after determining (in Step 314) that the target client device of the live-mounting is the above-mentioned client device, on which the given asset resides, an asset golden copy, corresponding to the given asset, is live-mounted onto the aforementioned client device. In one embodiment of the invention, an asset golden copy may represent a pointer-based snapshot of a selected data file (described above) maintained by/on a backup asset, corresponding to an asset, which may reside on the backup storage system (see e.g., FIG. 1D). Specifically, an asset golden copy may retain a given asset state, of an asset, from which asset data recovery may depend. Live-mounting of the asset golden copy is described in further detail below with respect to FIG. 4.

In Step 318, after alternatively determining (in Step 314) that the target client device of the live-mounting is a proxy client device, the proxy client device is selected. In one embodiment of the invention, a proxy client device may refer to a standby (i.e., unused or unallocated) client device that may be brought online to host one or more live-mounted (described above) (see e.g., FIG. 1C) asset (or database) golden copies. Further, the proxy client device may be selected from a set of prescribed proxy client devices enumerated in a proxy pool residing on the client device manager (see e.g., FIG. 1B).

In Step 320, an asset golden copy (described above), corresponding to the given asset, is live-mounted onto the proxy client device (selected in Step 318). Live-mounting of the asset golden copy is described in further detail below with respect to FIG. 4.

Figure 4:
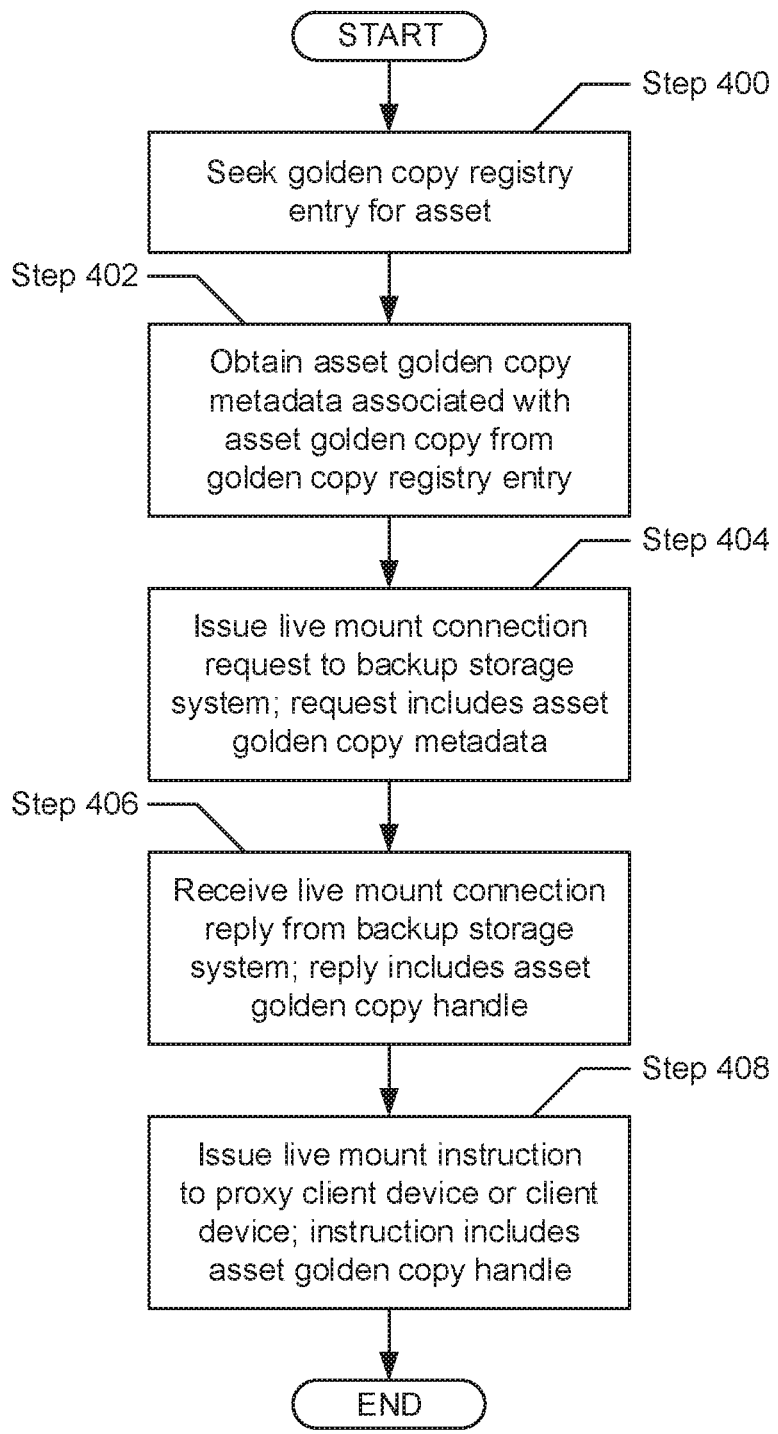
FIG. 4 shows a flowchart describing a method for live-mounting databases in accordance with one or more embodiments of the invention.

FIG. 4 shows a flowchart describing a method for live-mounting databases in accordance with one or more embodiments of the invention. The various steps outlined below may be performed by the client device manager (see e.g., FIGS. 1A and 1B). Further, while the various steps in the flowcharts are presented and described sequentially, one of ordinary skill will appreciate that some or all steps may be executed in different orders, may be combined or omitted, and some or all steps may be executed in parallel.

Turning to FIG. 4, in Step 400, a lookup is performed on a golden copy registry (described above) (see e.g., FIG. 1B) for an entry mapping to a given asset (or database). In one embodiment of the invention, the given asset may reside, or may have resided, on a client device (see e.g., FIG. 1C). Further, the lookup may be performed using asset metadata associated with the given asset—e.g., a global asset name assigned to the given asset—and, accordingly, may result in the identification of a golden copy registry entry for the given asset.

In Step 402, asset golden copy metadata is retrieved from the golden copy registry entry for the given asset (identified in Step 400). In one embodiment of the invention, asset golden copy metadata may refer to information descriptive of an asset golden copy of the given asset. The asset golden copy may represent a pointer-based snapshot of a selected data file (described above) maintained by/on a backup asset, corresponding to the given asset, residing on the backup storage system (see e.g., FIG. 1D). Specifically, the asset golden copy may retain a given asset state, of the given asset, from which asset data recovery may depend. Selection and/or update of the given asset state, preserved as the asset golden copy for the given asset, may be defined through criteria configured by a system, database, and/or client device administrator. Furthermore, the retrieved asset golden copy metadata may include, but is not limited to, a global asset identifier assigned to the given asset with which the asset golden copy is associated; a global backup asset identifier assigned to a backup asset (see e.g., FIG. 1D) on which the asset golden copy may be maintained; a global asset golden copy identifier assigned to the asset golden copy; and a directory path, in a backup file system (see e.g., FIG. 1D), at which the asset golden copy may be stored on the backup storage system.

In Step 404, a live mount connection request is issued. In one embodiment of the invention, the live mount connection request may be directed to the backup storage system, which may be reachable using, for example, a network (e.g., Internet Protocol (IP)) address and network port, for accepting connection requests, specified in tracked backup storage system metadata associated with the backup storage system. Further, the live mount connection request may include at least a portion of the asset golden copy metadata (retrieved in Step 402).

In Step 406, a live mount connection reply is received. In one embodiment of the invention, the live mount connection reply may be received from the backup storage system and in response to the live mount connection request (issued in Step 404). Further, the live mount connection reply may include an asset golden copy clone handle. The asset golden copy clone handle may represent a referencing object, assigned by the backup operating system (see e.g., FIG. 1D) on the backup storage system, which may be used by a user program, on a target client device, to logically access asset data maintained by/on an asset golden copy clone (i.e., pointer-based snapshot) of the above-mentioned asset golden copy.

In Step 408, a live mount instruction is issued. In one embodiment of the invention, the live mount instruction may be directed to a target client device on which the asset golden copy is intended to be live-mounted. The target client device may be identified based on the target client device attribute (described above) (see e.g., FIG. 1B) under the unresponsiveness or asset abnormality clause of an auto-mount policy for the client device on which the given asset originally resided. More specifically, based on the auto-mount policy, the target client device may either reference the aforementioned client device on which the given asset originally resided, or a proxy client device. Furthermore, the live mount instruction may include the asset golden copy clone handle (received in Step 406).

Figure 5:
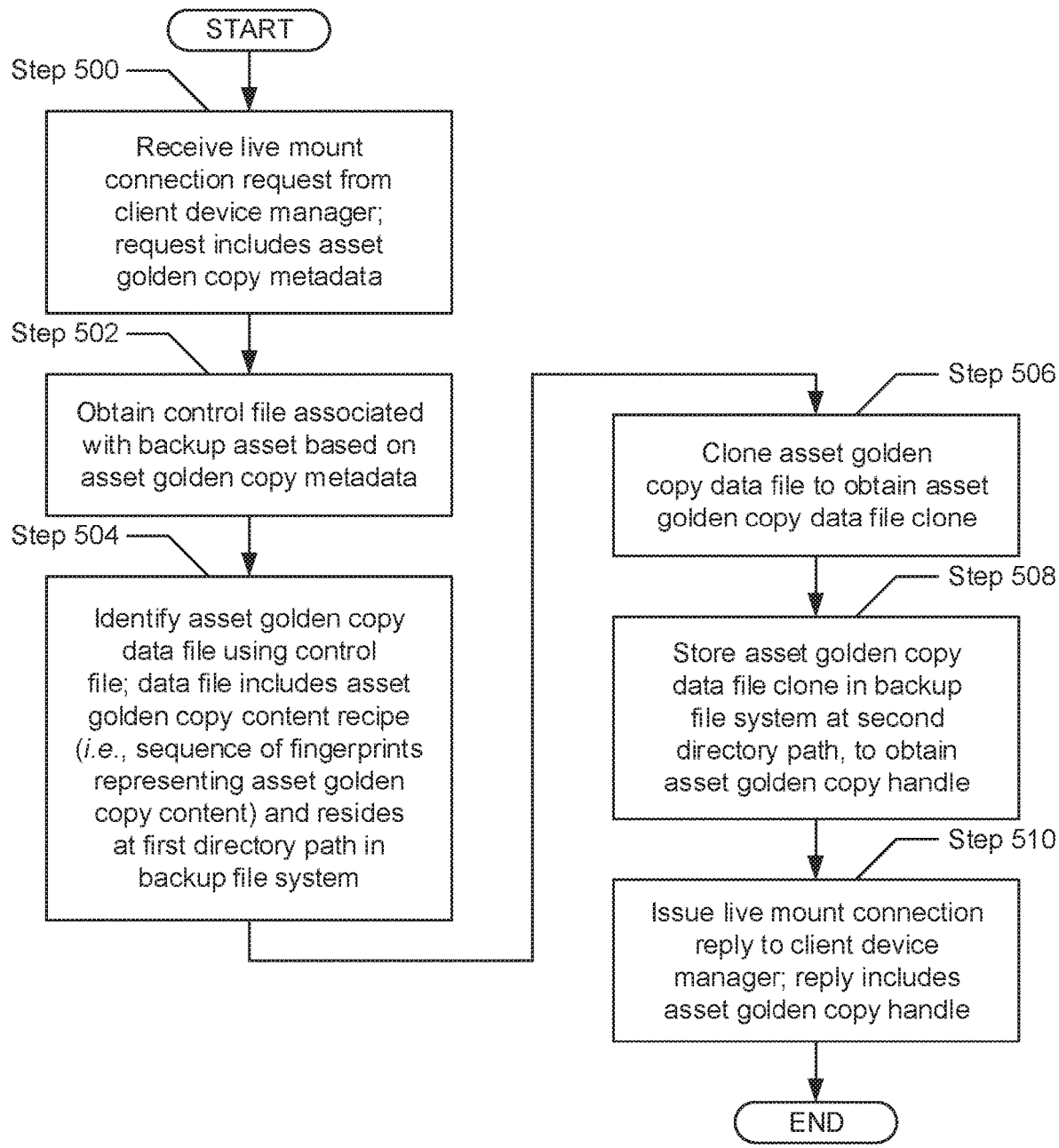
FIG. 5 shows a flowchart describing a method for processing live mount connection requests in accordance with one or more embodiments of the invention.

FIG. 5 shows a flowchart describing a method for processing live mount connection requests in accordance with one or more embodiments of the invention. The various steps outlined below may be performed by the backup storage system (see e.g., FIGS. 1A and 1D). Further, while the various steps in the flowcharts are presented and described sequentially, one of ordinary skill will appreciate that some or all steps may be executed in different orders, may be combined or omitted, and some or all steps may be executed in parallel.

Turning to FIG. 5, in Step 500, a live mount connection request is received from a client device manager (see e.g., FIGS. 1A and 1B). In one embodiment of the invention, the live mount connection request may pertain to accessing asset (i.e., database) golden copy data—in entirety or at any granular level—stored on the backup storage system. Further, the live mount connection request may include asset golden copy metadata associated with the asset golden copy corresponding to a given asset. The asset golden copy metadata may include, but is not limited to, a global asset identifier assigned to the given asset, on a given client device (see e.g., FIG. 1C), with which the asset golden copy is associated; a global backup asset identifier assigned to a backup asset (see e.g., FIG. 1D) on which the asset golden copy may be maintained; a global asset golden copy identifier assigned to the asset golden copy; and a directory path, in a backup file system (see e.g., FIG. 1D), at which the asset golden copy may be stored on the backup storage system.

In Step 502, a control file, associated with backup asset maintaining the sought asset golden copy data, is obtained. In one embodiment of the invention, the control file may refer to a database object for storing backup asset (see e.g., FIG. 1D) metadata (also referred to as backup database metadata) descriptive of the status and structure of a backup asset corresponding to the given asset. By way of examples, the control file may include, but is not limited to, a global database name assigned to the backup asset; the global file name(s) and storage location(s) of one or more data files and redo log files associated with the backup asset; a creation timestamp encoding the date and/or time marking the creation of the backup asset; and a log sequence number associated with a current redo log file maintained on the backup asset. Furthermore, the control file may be identified based on at least a portion of the asset golden copy metadata (received in Step 500).

In Step 504, a particular data file, maintained by/on the above-mentioned backup asset, is identified. In one embodiment of the invention, the particular data file may be representative of the asset golden copy sought to be live-mounted. Further, the particular data file (i.e., asset golden copy) may be identified using the control file (obtained in Step 502).

In Step 506, the asset golden copy (identified in Step 504) is cloned. In one embodiment of the invention, cloning of the asset golden copy may entail generating a pointer-based snapshot of the asset golden copy. That is, rather than cloning or copying the physical database data itself, associated with the asset golden copy, generation of a pointer-based snapshot exercises the cloning or copying of the asset golden copy content recipe (described above) (see e.g., FIG. 1C). Subsequently, the cloning process of the asset golden copy is rapid despite the physical storage space consumed by the associated physical database data; and, further, the cloning process results in the obtaining of an asset golden copy clone, which consumes little to no physical storage capacity.

In Step 508, the asset golden copy clone (obtained in Step 506) is stored in the backup file system on the backup storage system. More specifically, in one embodiment of the invention, whereas the asset golden copy may have been stored in a first directory path of the backup file system, the asset golden copy clone may be stored in a second (or different) directory path of the backup file system following the cloning process. Furthermore, upon storing the asset golden copy clone in the backup file system, an asset golden copy clone handle may be obtained. The asset golden copy clone handle may represent a referencing object, assigned by the backup operating system (see e.g., FIG. 1D) on the backup storage system, which may be used by a user program, on a target client device, to logically access asset data maintained by/on the asset golden copy clone.

In Step 510, a live mount connection reply is issued. In one embodiment of the invention, the live mount connection reply may be directed to the client device manager (from which the live mount connection request had been received in Step 500). Further, the live mount connection reply may include the asset golden copy clone handle (obtained in Step 508).

Figure 6:
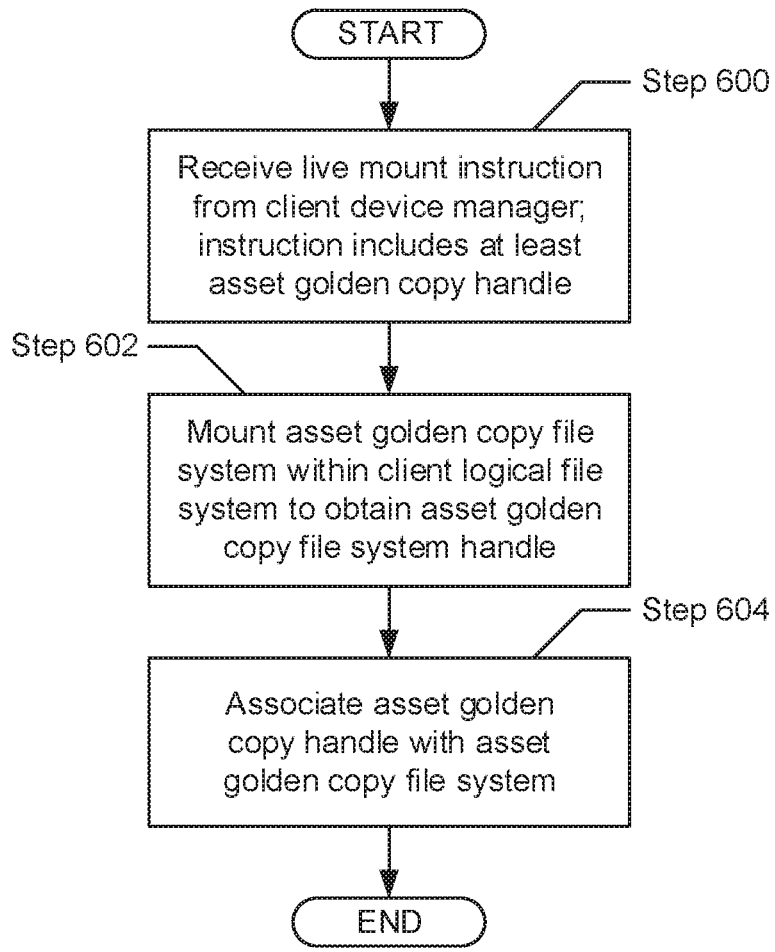
FIG. 6 shows a flowchart describing a method for processing live mount instructions in accordance with one or more embodiments of the invention.

FIG. 6 shows a flowchart describing a method for processing live mount instructions in accordance with one or more embodiments of the invention. The various steps outlined below may be performed by a target client device (see e.g., FIGS. 1A and 1C). Further, while the various steps in the flowcharts are presented and described sequentially, one of ordinary skill will appreciate that some or all steps may be executed in different orders, may be combined or omitted, and some or all steps may be executed in parallel.

Turning to FIG. 6, in Step 600, a live mount instruction is received from a client device manager (see e.g., FIGS. 1A and 1B). In one embodiment of the invention, the live mount instruction may include an asset golden copy clone handle. The asset golden copy clone handle may represent a referencing object, assigned by the backup operating system (see e.g., FIG. 1D) on a backup storage system, which may be used by a user program, on the target client device, to logically access asset data maintained by/on an asset golden copy clone residing on the backup storage system.

In Step 602, an asset golden copy file system is mounted on the target client device. In one embodiment of the invention, the asset golden copy file system may refer to a collection of in-memory data structures that may be used to organize and manage the asset (or database) data—in entirety or at any granular level—maintained by/on the above-mentioned asset golden copy clone. Further, the asset golden copy file system may be mounted at a given mount point within the client logical file system (described above) (see e.g., FIG. 1C). The given mount point may refer to a directory path through which the asset data, maintained by/on the asset golden copy clone, may be accessed logically by the user program(s) executing on the target client device. Moreover, following the creation and mounting of the asset golden copy file system, an asset golden copy file system handle may be obtained. The asset golden copy file system handle may represent a referencing object, assigned by the client operating system on the target client device, which may be used by the user program(s) thereon to logically access the asset data maintained by/on the asset golden copy clone on the backup storage system.

In Step 604, the asset golden copy clone handle (received in Step 600) is associated with the asset golden copy file system (mounted in Step 602). In one embodiment of the invention, associating the asset golden copy clone handle with the asset golden copy file system may configure and expose an application programming interface (API) through which file operations, invoked by the user program(s) on the target client device, may remotely access and manipulate the asset data maintained by/on the asset golden copy clone on the backup storage system.

Figure 7:
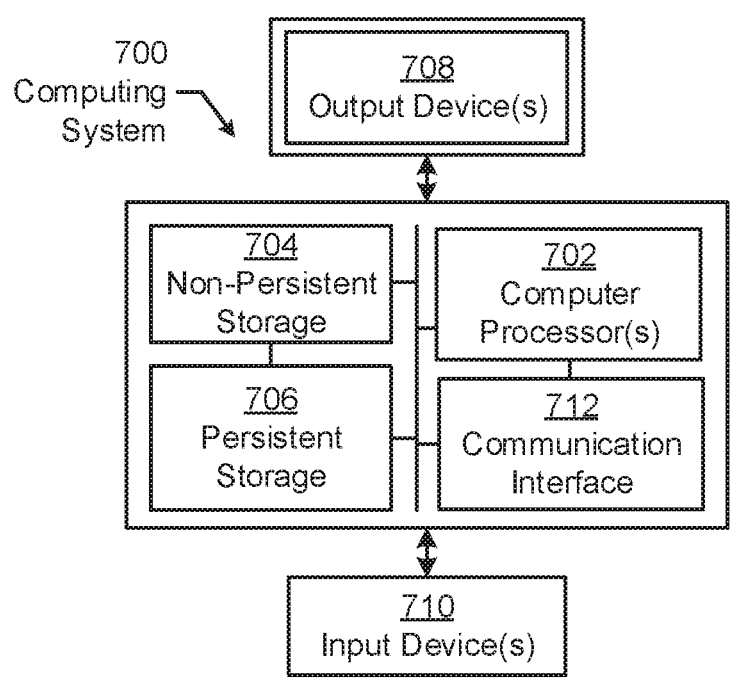
FIG. 7 shows an exemplary computing system in accordance with one or more embodiments of the invention.

FIG. 7 shows an exemplary computing system in accordance with one or more embodiments of the invention. The computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a central processing unit (CPU) and/or a graphics processing unit (GPU). The computing system (700) may also include one or more input devices (710), such as a touchscreen, keyboard, mouse, microphone, touchpad, electronic pen, or any other type of input device. Further, the communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

In one embodiment of the invention, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for accessing asset data, comprising:
obtaining, from an asset state monitor and for an asset residing on a client device, a first operational state indicative that the asset is exhibiting an asset abnormality;
identifying, in response to the first operational state, an auto-mount policy for the client device;
examining an asset abnormality clause of the auto-mount policy; and
based on the asset abnormality matching a trigger abnormality of a set of trigger abnormalities specified under the asset abnormality clause:
live-mounting an asset golden copy for the asset onto a target client device,
wherein live-mounting the asset golden copy for the asset onto the target client device, comprises:
retrieving, from a golden copy registry, asset golden copy metadata associated with the asset golden copy, wherein the golden copy registry indexes the asset golden copy metadata, respective to the asset, based on a global asset identifier assigned to the asset;
issuing, to a backup storage system, a live mount connection request comprising the asset golden copy metadata;
receiving, from the backup storage system and in response to the live mount connection request, an asset golden copy handle; and
issuing, to the target client device, a live mount instruction comprising the asset golden copy handle.

2. The method of claim 1, wherein the asset comprises a database.

3. The method of claim 1, wherein the asset abnormality is one selected from a group consisting of an inaccessibility issue, a corruption issue, an inconsistency issue, and a failure issue, inflicting the asset.

4. The method of claim 1, wherein the target device is one selected from a group consisting of the client device and a proxy client device.

5. The method of claim 1, wherein the asset golden copy handle enables access to asset data maintained on an asset golden copy clone of the asset golden copy.

6. The method of claim 5, wherein the asset golden copy clone resides on the backup storage system and access to the asset data is facilitated through a distributed file system protocol between the backup storage system and the target client device.

7. The method of claim 1, further comprising:
obtaining, from a device state monitor and for the client device, a second operational state indicative that the client device is unresponsive;
identifying, in response to the second operational state, the auto-mount policy for the client device;
examining an unresponsiveness clause of the auto-mount policy; and
based on an identification of a set of assets specified under the unresponsiveness clause:
live-mounting a respective asset golden copy stored locally for each asset of the set of assets onto a proxy client device.

8. A client device manager, comprising:
a computer processor;
an asset state monitor executing on the computer processor; and
a manager kernel operatively connected to the asset state monitor, and comprising the computer processor or executing on the computer processor,
a backup storage system operatively connected to the client device manager; and
a golden copy registry operatively connected to the manager kernel,
wherein the manager kernel is configured to:
obtain, from the asset state monitor and for an asset residing on a client device, a first operational state indicative that the asset is exhibiting an asset abnormality;
identify, in response to the first operational state, an auto-mount policy for the client device;
examine an asset abnormality clause of the auto-mount policy; and
based on the asset abnormality matching a trigger abnormality of a set of trigger abnormalities specified under the asset abnormality clause:
live-mount an asset golden copy for the asset onto a target client device,
wherein to live-mount the asset golden copy for the asset onto the target client device, the manager kernel is configured to:
retrieve, from the golden copy registry, asset golden copy metadata associated with the asset golden copy, wherein the golden copy registry indexes the asset golden copy metadata, respective to the asset, based on a global asset identifier assigned to the asset;
issue, to the backup storage system, a live mount connection request comprising the asset golden copy metadata;
receive, from the backup storage system and in response to the live mount connection request, an asset golden copy handle; and
issue, to the target client device, a live mount instruction comprising the asset golden copy handle.

9. The client device manager of claim 8, further comprising:
a proxy client device and the client device both operatively connected to the client device manager,
wherein the target client device is one selected from a group consisting of the client device and the proxy client device.

10. The client device manager of claim 8, further comprising:
a device state monitor operatively connected to the manager kernel,
wherein the manager kernel is further configured to:
obtain, from the device state monitor and for the client device, a second operational state indicative that the client device is unresponsive;
identify, in response to the second operational state, the auto-mount policy for the client device;
examine an unresponsiveness clause of the auto-mount policy; and
based on an identification of a set of assets specified under the unresponsiveness clause:
live-mount a respective asset golden copy for each asset of the set of assets onto a proxy client device.

11. A non-transitory computer readable medium (CRM) comprising computer readable program code, which when executed by a computer processor, enables the computer processor to:
- obtain, from an asset state monitor and for an asset residing on a client device, a first operational state indicative that the asset is exhibiting an asset abnormality;
- identify, in response to the first operational state, an auto-mount policy for the client device;
- examine an asset abnormality clause of the auto-mount policy; and
- based on the asset abnormality matching a trigger abnormality of a set of trigger abnormalities specified under the asset abnormality clause:
  - live-mount an asset golden copy for the asset onto a target client device, wherein the computer readable program code directed to live-mounting the asset golden copy for the asset onto the target client device, which when executed by the computer processor, enables the computer processor to:
    - retrieve, from a golden copy registry, asset golden copy metadata associated with the asset golden copy, wherein the golden copy registry indexes the asset golden copy metadata, respective to the asset, based on a global asset identifier assigned to the asset;
    - issue, to a backup storage system, a live mount connection request comprising the asset golden copy metadata;
    - receive, from the backup storage system and in response to the live mount connection request, an asset golden copy handle; and
    - issue, to the target client device, a live mount instruction comprising the asset golden copy handle.

12. The non-transitory CRM of claim 11, wherein the asset comprises a database.

13. The non-transitory CRM of claim 11, wherein the asset abnormality is one selected from a group consisting of an inaccessibility issue, a corruption issue, an inconsistency issue, and a failure issue, inflicting the asset.

14. The non-transitory CRM of claim 11, wherein the target device is one selected from a group consisting of the client device and a proxy client device.

15. The non-transitory CRM of claim 11, wherein the asset golden copy handle enables access to asset data maintained on an asset golden copy clone of the asset golden copy.

16. The non-transitory CRM of claim 15, wherein the asset golden copy clone resides on the backup storage system and access to the asset data is facilitated through a distributed file system protocol between the backup storage system and the target client device.

17. The non-transitory CRM of claim 11, comprising computer readable program code, which when executed by the computer processor, further enables the computer processor to:
- obtain, from a device state monitor and for the client device, a second operational state indicative that the client device is unresponsive;
- identify, in response to the second operational state, the auto-mount policy for the client device;
- examine an unresponsiveness clause of the auto-mount policy; and
- based on an identification of a set of assets specified under the unresponsiveness clause:
  - live-mount a respective asset golden copy for each asset of the set of assets onto a proxy client device.

* * * * *